(12) United States Patent
Tzur et al.

(10) Patent No.: US 7,995,097 B2
(45) Date of Patent: Aug. 9, 2011

(54) TECHNIQUES OF MOTION ESTIMATION WHEN ACQUIRING AN IMAGE OF A SCENE THAT MAY BE ILLUMINATED WITH A TIME VARYING LUMINANCE

(75) Inventors: Meir Tzur, Haifa (IL); Victor Pinto, Zichron-Yaakov (IL); Eran Pinhasov, Zichron-Yaakov (IL)

(73) Assignee: Zoran Corporation, Sunnyvale, CA (US)

( * ) Notice: Subject to any disclaimer, the term of this patent is extended or adjusted under 35 U.S.C. 154(b) by 1082 days.

(21) Appl. No.: 11/754,104

(22) Filed: May 25, 2007

(65) Prior Publication Data

US 2008/0291288 A1 Nov. 27, 2008

(51) Int. Cl.
*H04N 7/18* (2006.01)
*H04N 3/08* (2006.01)
*H04N 5/222* (2006.01)
*G06K 9/00* (2006.01)

(52) U.S. Cl. ............ 348/155; 348/222.1; 348/370; 382/107

(58) Field of Classification Search .......... 348/154–155, 348/226.1, 222.1, 228.1, 227.1, 221.1, 362, 348/364, 370, 371; 382/107
See application file for complete search history.

(56) References Cited

U.S. PATENT DOCUMENTS

| | | | |
|---|---|---|---|
| 5,019,901 A | 5/1991 | Uomori et al. | |
| 6,078,617 A | 6/2000 | Nakagawa et al. | |
| 6,819,713 B1 | 11/2004 | Sato | |
| 7,623,152 B1* | 11/2009 | Kaplinsky | 348/208.16 |
| 2001/0014125 A1 | 8/2001 | Endo | |
| 2004/0042552 A1 | 3/2004 | Dvorkovich et al. | |
| 2004/0047419 A1* | 3/2004 | Wakabayashi et al. | 375/240.16 |
| 2006/0017814 A1 | 1/2006 | Pinto et al. | |
| 2007/0092244 A1 | 4/2007 | Pertsel et al. | |
| 2008/0101786 A1 | 5/2008 | Pozniansky et al. | |

OTHER PUBLICATIONS

Treves et al., "Motion Estimation and Compensation Under Varying Illumination," ICIP'94, Nov. 13-16, Austin, Texas, USA, 5 pages.

* cited by examiner

*Primary Examiner* — Lin Ye
*Assistant Examiner* — Mekonnen Dagnew
(74) *Attorney, Agent, or Firm* — Perkins Coie LLP

(57) ABSTRACT

In a digital camera or other image acquisition device, motion vectors between successive image frames of an object scene are calculated from normalized values of pixel luminance in order to reduce or eliminate any effects on the motion calculation that might occur when the object scene is illuminated from a time varying source such as a fluorescent lamp. Calculated motion vectors are checked for accuracy by a robustness matrix.

41 Claims, 5 Drawing Sheets

TECHNIQUES OF MOTION ESTIMATION WHEN ACQUIRING AN IMAGE OF A SCENE THAT MAY BE ILLUMINATED WITH A TIME VARYING LUMINANCE

BACKGROUND AND SUMMARY

This application relates to the automatic operation of digital cameras and other electronic digital image acquisition devices, and particularly to the estimation of image motion between successive image frames.

Electronic cameras image scenes onto a two-dimensional sensor such as a charge-coupled-device (CCD), a complementary metal-on-silicon (CMOS) device or other type of light sensor. These devices include a large number of photo-detectors (typically four, six, eight or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data representative of the intensity of radiation striking one sensor element after another as they are scanned. Color data are most commonly obtained by using photo-detectors that are sensitive to each of distinct color components (such as red, green and blue), alternately distributed across the sensor.

A popular form of such an electronic camera is a small hand-held digital camera that records data of a large number of picture frames either as still photograph "snapshots" or as sequences of frames forming a moving picture. A significant amount of image processing is typically performed on the data of each frame within the camera before storing on a removable non-volatile memory such as a magnetic tape cartridge, a flash memory card, a recordable optical disc or a removable hard disk drive. The processed data are typically displayed as a reduced resolution image on a liquid crystal display (LCD) device on the outside of the camera. The processed data are also typically compressed before storage in the non-volatile memory in order to reduce the amount of storage capacity that is taken by the data for each picture frame.

The data acquired by the image sensor are typically processed to compensate for imperfections of the camera and to generally improve the quality of the image obtainable from the data. The correction for any defective pixel photodetector elements of the sensor is one such processing function. Another is white balance correction wherein the relative magnitudes of different pixels of the primary colors are set to represent white. This processing also includes de-mosaicing the individual pixel data to superimpose data from spatially separate monochromatic pixel detectors of the sensor, if such a sensor is being used, to render superimposed multi-colored pixels in the image data. This de-mosaicing then makes it desirable to further process the data to enhance and smooth edges of the image. Compensation of the image data for noise and variations of the camera optical system across the image, and for variations among the sensor photodetectors are also typically performed within the camera. Other processing typically includes one or more of gamma correction, contrast stretching, chrominance filtering and the like.

Electronic cameras also nearly always include an automatic exposure control capability that sets the exposure time, size of its aperture opening and analog electronic gain of the sensor to result in the luminance of the image or succession of images being at a certain level based upon calibrations for the sensor being used and user preferences. These exposure parameters are calculated in advance of the picture being taken, and then used to control the camera during acquisition of the image data. For a scene with a particular level of illumination, a decrease in the exposure time is compensated by increasing the size of the aperture or the gain of the sensor, or both, in order to obtain the data within a certain luminance range. An increased aperture results in an image with a reduced depth of field and increased optical blur, and increasing the gain causes the noise within the image to increase. Conversely, when the exposure time can be increased, the aperture and/or gain are reduced, which results ill the image having a greater depth of field and/or reduced noise. In addition to analog gain being adjusted, or in place of it, the digital gain of an image is often adjusted after the data have been captured.

It is often difficult for the user to hold a camera by hand during an exposure without imparting some degree of shake or jitter, particularly when the camera is very small and light. As a result, the captured image may have a degree of overall motion blur that depends on the exposure time, the longer the time the more motion blur in the image. In addition, long exposures of a scene that is totally or partially moving can also result in motion blur in the captured image. A person or object moving across the scene, for example, may appear blurred in the image while the rest of the image is sharp. The automatic exposure processing of existing cameras does not normally take into account motion of the camera or motion within the scene when calculating the exposure parameters to be used to capture an image of the scene.

However, the camera system disclosed in United States patent application publication no. 2007/0092244 A1, entitled "Camera Exposure Optimization Techniques that Take Camera and Scene Motion into Account," does consider image motion when setting exposure parameters. Motion is detected and the exposure parameters are set, in advance of capturing data of the image, to levels that enhance the captured image based upon the amount of motion of the scene relative to the image frame within the camera.

If the motion cannot be eliminated or reduced to a satisfactory level by the control of the exposure parameters, or it is desired not to do so, the image may still be stabilized by processing the image data with the knowledge of image motion. An example of this is given in United States patent application publication no. 2006/0017814 A1, entitled "Processing of Video Data to Compensate for Unintended Camera Motion Between Acquired Image Frames." Motion of the image can also be controlled by using an estimate of image motion to set the brightness and/or duration and/or frequency of light pulses from a flash lamp or other artificial illumination source. This is described in U.S. patent application Ser. No. 11/552,717, filed Oct. 25, 2006, and entitled "Control of Artificial Lighting of a Scene to Reduce Effects of Motion in the Scene on an Image being Acquired."

Motion is preferably measured by calculating motion quantities from data of two or more images acquired just prior to capturing data of the final image (that is, using "pre-capture" images). Motion vectors that define the amount of motion of the scene image relative to the camera, including motion within the scene, are preferably calculated. Although the presence of motion blur can be detected from data of a single image, the calculation of motion vectors from two or more pre-capture images provides a quantitative estimate that can be used to control the effects of the motion.

One difficulty with existing techniques for calculating motion vectors is that illumination of the object scene with a varying illumination can be misinterpreted as image motion.

This can occur, for example, when a significant amount of the illumination of the object scene comes from a fluorescent light source. If the intensity of illumination of the object scene is one level when the first image frame is acquired and a significantly different level when the second image frame is acquired, motion estimated from the data of these two frames will most likely be erroneous. This is because motion is typically detected by monitoring how the luminance of one image is different from that of the other image.

Therefore, in order to reduce the effect of the varying object scene illumination as a factor causing error in image motion estimations, the data of the two acquired images are normalized, and the normalized values are then used to calculate a motion estimate. In a preferred implementation, the normalization includes calculating a mean value of pixels for each of many blocks of pixels in both of the two images and then arithmetically combining the mean value with the values of individual pixels in the block, such as subtracting one from the other. The normalized pixel values are then used to estimate motion in an otherwise conventional manner, such as by use of a sum of absolute differences (SAD) algorithm. Instead of the actual values of the pixels, the mean normalized values are used to estimate motion. This significantly reduces, or even eliminates, the effects on the motion estimate of a varying illumination of the object scene during acquisition of the image frames used to calculate motion.

Although the image data are normalized for the purpose of calculating motion estimates, the image data are used to form image frames, for subsequent viewing or other use, without such normalization. This provides data of image frames outputted from the camera that are accurate representations of the full range of luminance across the object scene.

The SAD algorithm is used to calculate values based on differences in absoluted values of normalized luminance between corresponding portions of two successive image frames. For each image portion, this calculation is made many times with the SAD equation, each time with different values of vectors of motion between the two image frame portions being assumed. The assumed motion vectors that gives the smallest calculated value of the SAD equation are taken to be an estimate of the motion between the portion of the image frames.

But certain image patterns can cause the multiple calculations made by the SAD equation to give a minimum that is not that much different than the results obtained with other assumed motion vectors. Therefore, in order to verify that the minimum calculated by the SAD algorithm provides a correct motion estimate for the image portion, a confidence matrix of the luminance data is preferably additionally used to either accept or reject the individual motion estimates made by the SAD algorithm, a feature currently not available with the SAD algorithm. Briefly and generally, individual values of the matrix are calculated by dividing an absolute difference between values of the luminance of the frame for assumed motion vectors by a sum of those absolute luminance values. If this calculation made for the motion vectors that gave the minimum value is less than a set threshold, and if the next closest quantities obtained by this confidence calculation for other motion vectors are not very close to this minimum, then there can be confidence that the motion estimate made by the SAD algorithm is robust. But if not, it is determined that no motion estimate can be made for the portion of the image, rather than use the result of the SAD algorithm which may not be correct in that case. The confidence matrix used with the embodiments described herein is based on the normalized image data values but may also be utilized in the same manner with image data that have not been normalized.

Additional aspects, advantages and features of the present invention are included in the following description of exemplary examples thereof, which description should be taken in conjunction with the accompanying drawings.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

DETAILED DESCRIPTION OF EXEMPLARY EMBODIMENTS

Electronic Camera Example

Figure 1:
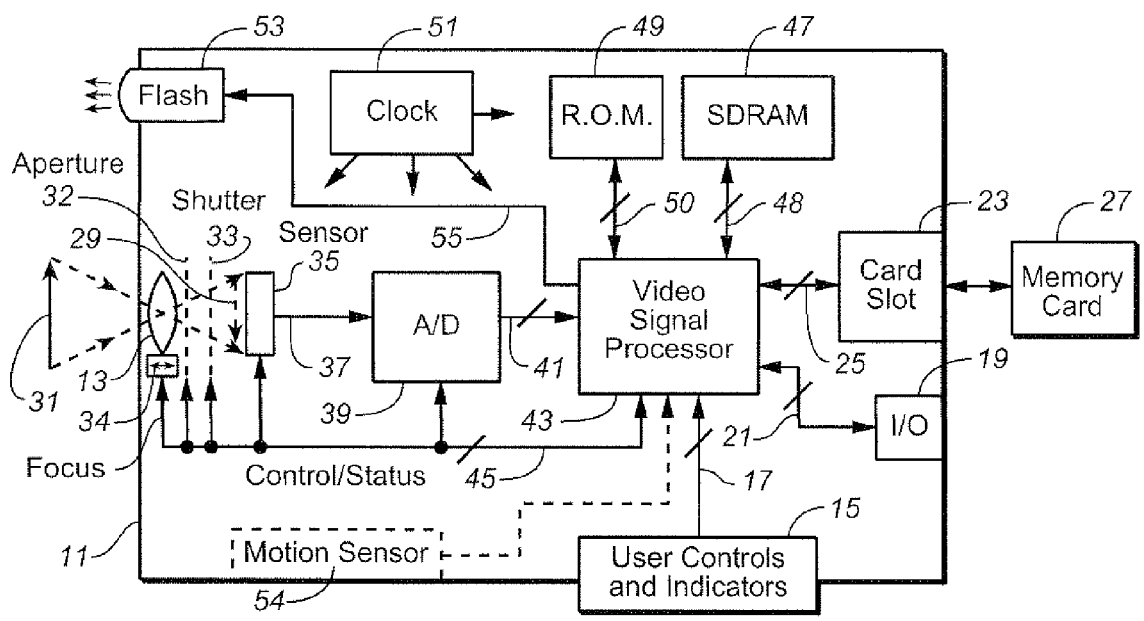
FIG. 1 shows, in block diagram form, a camera or other video acquisition device in which the exposure control techniques of the present invention may be implemented.

In FIG. 1, an example of a camera in which the motion estimation techniques described herein may be implemented is schematically shown, which may be a still camera or a video camera. It includes a case 11, an imaging optical system 13, user controls and indicators 15 that generate and receive control signals 17, a video input-output receptacle 19 with internal electrical connections 21, and a card slot 23, with internal electrical connections 25. A non-volatile memory card 27 is removably inserted into the card slot 23. Data of images captured by the camera may be stored on the memory card 27 or in an internal non-volatile memory (not shown). Image data may also be outputted to another video device through the receptacle 19. The memory card 27 can be a commercially available semiconductor flash memory, small removable rotating magnetic disk or other non-volatile memory to which video data can be written by the camera.

The optical system 13 can be a single lens, as shown, but will normally be a set of lenses. An image 29 of a scene 31 is formed in visible optical radiation through an aperture 32 and a shutter 33 onto a two-dimensional surface of an image sensor 35. A motive element 34 moves one or more elements of the optical system 13 to focus the image 29 on the sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of video data from which the image 29 may be reconstructed. The analog signal 37 is applied to an analog-to-digital converter circuit chip 39 that generates digital data in circuits 41 of the image 29. Typically, the signal in circuits 41 is a sequence of individual words of digital data representing the intensity of light striking the individual photo-detectors of the sensor 35.

The photo-detectors of the sensor 35 typically detect the intensity of the image pixel striking them in one of two or more individual color components. Early sensors detect only two separate colors of the image. Detection of three primary colors, such as red, green and blue (RGB) components, is common. Currently, image sensors that detect more than three color components are becoming available.

Processing of the video data in circuits 41 and control of the camera operation are provided, in this embodiment, by a single integrated circuit chip 43 (which may also include the analog-to-digital converter instead of using the separate circuit chip 39). These functions may be implemented by several integrated circuit chips connected together but a single chip is preferred. In addition to being connected with the circuits 17, 21, 25 and 41, the circuit chip 43 is connected to control and status lines 45. The lines 45 are, in turn, connected with the aperture 32, shutter 33, focus actuator 34, sensor 29, analog-to-digital converter 39 and other components of the camera to provide synchronous operation of them. Signals in the lines 45 from the processor 43 drive the focus actuator 34 and set the size of the opening of the aperture 32, as well as operate the shutter 33. The gain of the analog signal path is also set by the processor 43 through the lines 45. This gain typically takes place in the analog-to-digital converter which, in the case of a CCD sensor, is part of the sensor, or in the case of a CMOS sensor, is part of a separate analog-to-digital converter as shown in FIG. 1.

A separate volatile random-access memory circuit chip 47 is also connected to the processor chip 43 through lines 48 for temporary data storage. Also, a separate non-volatile memory chip 49 is connected to the processor chip 43 through lines 50 for storage of the processor program, calibration data and the like. The memory 49 may be flash memory, which is re-programmable, or a memory that is programmable only once, such as a masked programmable read-only-memory (PROM) or an electrically programmable read-only-memory (EPROM). A usual clock circuit 51 is provided within the camera for providing clock signals to the circuit chips and other components. Rather than a separate component, the clock circuit for the system may alternatively be included on the processor chip 43.

A source 53 of artificial illumination, such as a flash lamp or other source of light pulses, is preferably built into the camera case 11. The source 53 operates in response to control signals from the processor 43 through control lines 55. The source 53 is chosen to be a type that emits light pulses whose intensity and/or duration are controllable, and preferably both. Certain types of flash lamps currently used in cameras, such as xenon flash lamps, have a limited adjustability of pulse intensity and duration but other sources of light suitable for use in cameras, such white light-emitting-diodes (LEDs), are more continuously controllable. The processor 43 preferably controls the timing, intensity and duration of a light pulse output of the light source 53. Use of this control capability to minimize effects of camera and/or image motion when acquiring data of an image is described below.

Multiple illumination sources may alternatively be installed in the camera, pointing in different directions for the purpose of more uniformly illuminating an image filed over a wider field of view. All of the one or more light sources installed in a camera are preferably controlled by the processor 43. As a further alternative, one or more light sources may be located outside of the camera case 11 but it is certainly easier to control the effect of illumination source(s) that have a fixed physical relationship with the camera optics.

A motion sensor 54 may optionally also be included within the camera housing 11, its output connected to provide a signal to the processor 43 that is proportional to any motion of the camera relative to the scene that occurs during the capture of data of an image of the scene. Camera jitter often occurs during the taking of pictures with a hand held camera. The motion sensor 54 may be a gyroscope, accelerometer or some other mechanical device that provides an electrical output proportional to the magnitude and direction of motion of the camera. Some commercially available cameras include such a device. In one line of cameras, vibration reduction lenses are used. A measurement of camera motion causes the position of the lens to be moved in a manner that moves the image in a direction and distance across the photosensor that is equal and opposite to the direction of image movement caused by motion of the camera. This is a complicated electromechanical system and cannot compensate for motion of one object within a scene relative to other objects of the scene. Therefore, the estimation of motion from the acquired images themselves is preferred nearly all cases.

General Operation to Capture Image Data

Figure 2:
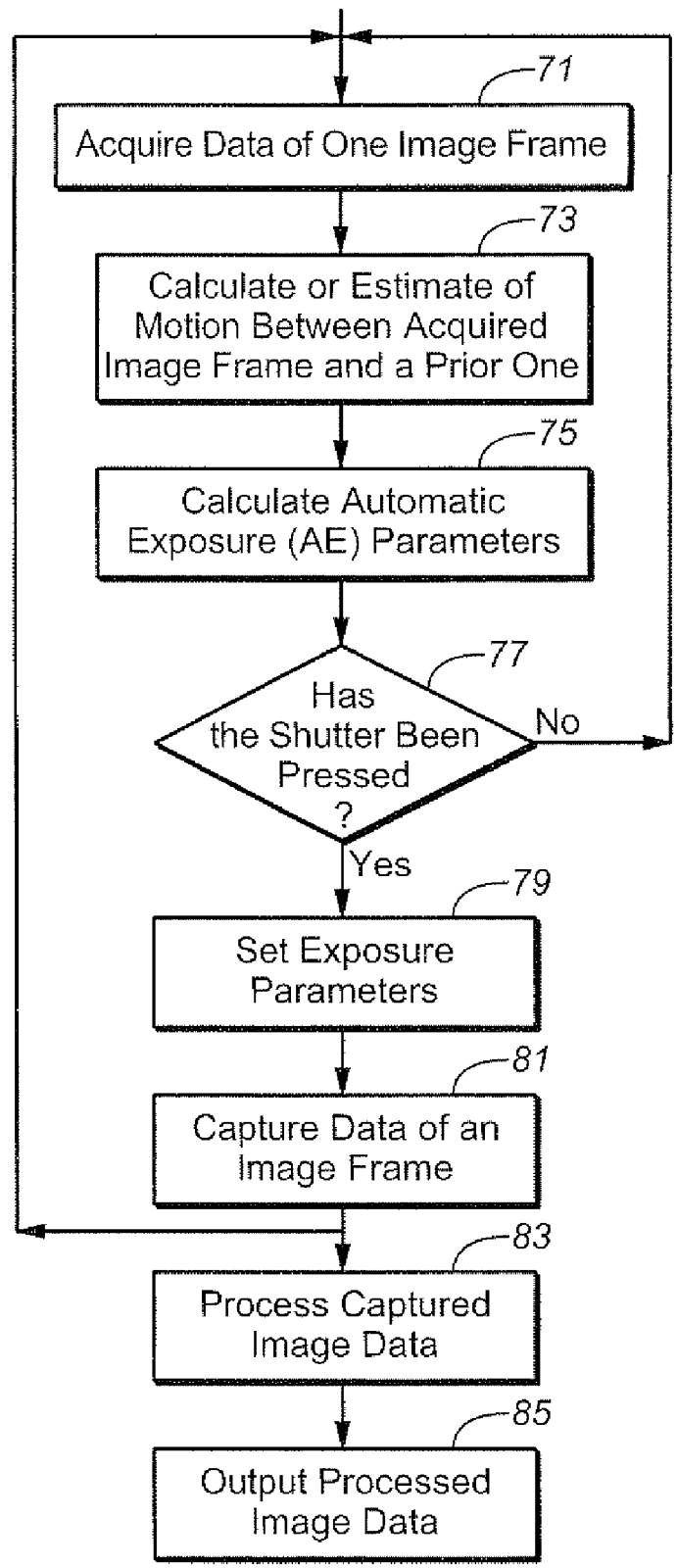
FIG. 2 is a flow chart that illustrates operation of the device of FIG. 1.

With reference to the flow chart of FIG. 2, an exemplary operation of the camera of FIG. 1, or other similar types of image acquisition devices, is explained. Data of image frames are typically acquired one at a time, in sequence, and preliminarily processed prior to knowing whether the user has depressed the shutter button. This allows a calculation of movement of a portion of the image, or of the entire image frame, to be made and ready when the shutter button is depressed. Exposure parameters may also be pre-calculated in the same manner. Acquisition of data of one image frame is indicated at 71 of FIG. 2. Motion is then calculated at 73 between the current image frame just acquired and a preceding frame, usually the frame acquired immediately before the current frame. Also, at 75, exposure parameters are calculated by existing techniques to maintain the average luminance across the image within a predefined range. Calculating settings for the duration of the exposure, size of the aperture and gain of the signal path are described in United States patent application publication no. 2007/0092244 A1. If the effects of image motion are to be considered when setting the duration and other exposure parameters, those image motion effects are typically not considered at this stage. The calculation of exposure parameters call also involve control of the brightness and/or duration of flash lamp or other artificial illumination, as described in U.S. patent application Ser. No. 11/552,717.

At 77, if the shutter has not been depressed, the processing returns to 71, where data of another image frame is acquired and the calculations of 73 and 75 made from data of the new image frame and the immediately preceding image frame. This continues until the camera user presses the shutter button. When that occurs, the exposure parameters for an image frame to be acquired are set, at 79. The parameters calculated at 75 are typically modified at this time to take into account other factors not included in the standard exposure calculation algorithm of 75, such as the motion of the image that is calculated at 73. Once the exposure parameters are set, the data of the image are captured at 81 with use of the set parameters.

Once this new image frame is captured, the processing returns to 71 to acquire data of another image frame, and then sequence through the processes described above for this new image. In parallel with this, data of the image frame that was captured at 81 may be processed and/or enhanced, at 83. This processing may include, for example, one or more of white balance correction, compensation for any defective pixel elements of the photosensor 35 (FIG. 1), de-mosaicing the pixel data, image edge smoothing, compensation for noise in the image data, gamma correction, contrast stretching, chrominance filtering, and correction for variations in the camera optical system. In some camera systems, only some of the desired image processing is performed within the camera and the balance is done as post-processing on the image data in a personal computer or the like. Once the processing within the camera at 83 is completed, the processed image data is typically outputted from the camera through the card slot 23 (FIG. 1) to the removable flash memory card 27 or through the other input/output port 19. These data are typically compressed with a standard algorithm but may also be outputted without any compression. The output may then be used to reconstruct images from the processed data and display the images in the camera or some other device such as a personal computer.

Image motion is calculated at 73 between two successive image frames, preferably the two image frames immediately preceding the image frame that is captured at 81. The preview image data acquired at 71 are typically of a reduced resolution image, where data of only a central pixel of a group of pixels are taken to represent the luminance of the group or some average of the pixels of the group is used instead. This reduces the amount of processing of the image data that is necessary to make motion estimates and perform other processing functions.

The motion estimate calculation of 73 may be used in any one or more of several ways within the camera, including but not limited to the following:

1) The motion of the image may be used to set the exposure parameters at 79, primarily the exposure duration but then also aperture and gain to compensate for any change made in the duration, so that the average luminance of the image cast on the photosensor remains unchanged. This is described in United States patent application publication no 2007/0092244 A1.

2) Image motion may also be used at 79 to set the intensity and/or pulse duration of a flash lamp or other artificial light source, as described in U.S. patent application Ser. No. 11/552,717.

3) The processing at 83 may include stabilizing the image, or portions of it, which is estimated at 73 to be moving. One way to do this is described in United States patent publication no. 2006/0017814 A1, 4) Since image motion is a component of some compression algorithms, the motion estimate at 73 may be used as part of data compression carried out at 83.

In the process of the flow chart of FIG. 2, modifications made at 73 to the data acquired at 71 for the purpose of estimating motion are not utilized in the image data outputted at 85. As described below, the image data acquired at 71 are normalized and certain calculations are made at 73 to estimate motion that are not performed on the data outputted at 85. Rather, only the motion estimate itself is used at 79 or 83 to control capturing or processing the image data.

Estimating Image Motion

In a standard design of a motion estimation module, the motion vectors are estimated based on the location of the global minimum of the sum of absolute differences (SAD) function:

$$SAD(MV_x, MV_y) = \sum_{y=1}^{bh} \sum_{x=1}^{bw} |T(x, y) - R(x + MV_x, y + MV_y)| \quad (1)$$

where data of a pair of image frames T and R are compared. T is considered to be the target image and R the reference image. $MV_x$ and $MV_y$ are motion vectors in the orthogonal x and y directions, respectively, across the image, measured in numbers of pixels of displacement between the target and reference images. Calculations are made with equation (1) multiple times, each time for different values of motion vectors $MV_x$ and $MV_y$, over a span across the images of a set number of pixels, such that $-s_x \leq MV_x \leq s_x$, and $-s_y \leq MV_y \leq s_y$, where $s_x$ is a number of pixels across the x-direction of the image block, and $s_y$ a number of pixels in the y-direction. This results in equation (1) providing many calculated values for the various combinations of $MV_x$ and $MV_y$ inserted into the equation, depending upon the number of pixels $s_x$ and $s_y$. The values of $MV_x$ and $MV_y$ that give the minimum value of SAD among all the solutions, the global minimum, are then taken to be the components of the motion vector between the target and reference images in the x and y directions, respectively. $MV_x$ and $MV_y$ may alternatively be considered to be orthogonal components of a single motion vector that is represented by a single magnitude and direction (angle).

Figure 4B:
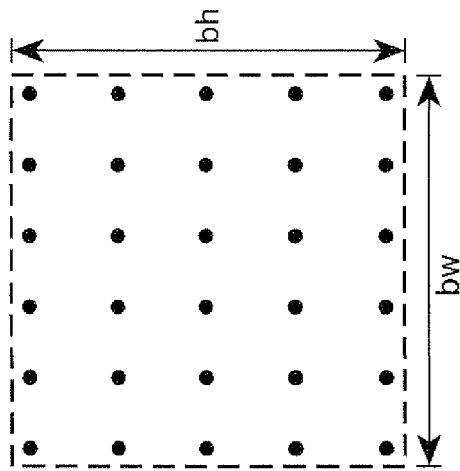
FIGS. 4A and 4B show groupings of image pixels used in the algorithm of FIG. 3.
Figure 4A:
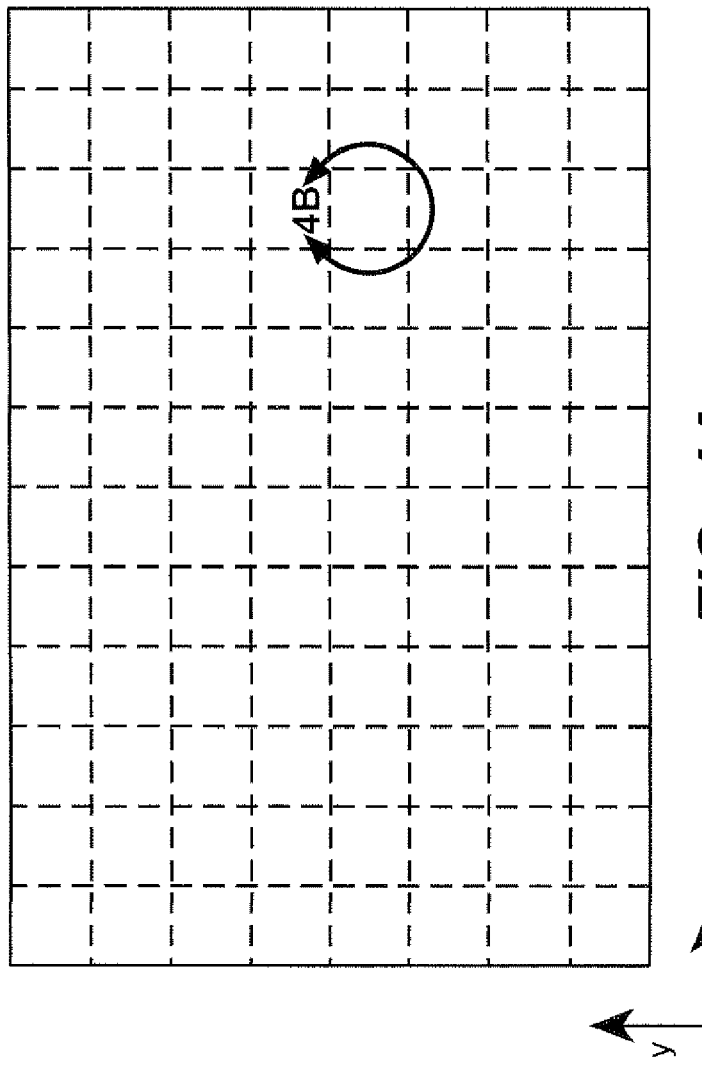

A calculation is made with equation (1) by summing values across a search block of the target image T and reference image R from 1 to bh in the y-direction and from 1 to bw in the x-direction. An example block is illustrated in FIG. 4B where each of the dots is an image pixel. The block of FIG. 4B is one of many blocks of an image of FIG. 4A. The calculation of equation (1) is made for each such block of pixels across the images, with the goal of determining the motion vector for each block.

In the case where the motion estimate is made on a reduced resolution image, each of the dots of FIG. 4B represents a value of luminance of a group of pixels. The luminance value of the group is typically the value of a central pixel of the group, as representative, or of an average of all pixels of the group.

Making a motion estimate with the SAD function of equation (1) has two main problems:

(i) The motion estimate has a high sensitivity to changes in scene illumination. That is, illumination differences of the object scene between the target and reference images results in an incorrect determination of the location of the SAD minimum, and therefore in an erroneous estimate of the corresponding motion vector. This may not occur often but it is desired to provide a camera that can be used to record images of most any type of object scene that is illuminated from most any type of natural or artificial illumination source. An example of when this error can occur is where an object scene is illuminated with fluorescent light, the intensity of which periodically varies.

(ii) The motion estimate lacks robustness. That is, the SAD equation minimum value gives no indication of how good the match is between the reference and target images. For example, high-amplitude similar target and reference images result in a minimum SAD value which may be much higher than the SAD minimum value of two low-amplitude non-similar images. Also, an image with an intensity variation in a direction being scanned that has a high spatial frequency with respect to the pixel spacing may give several values close to the global minimum and thus several corresponding values of $MV_x$ or $MV_y$, only one of which can be correct.

A simple SAD based solution for the illumination problem of (i) above uses the SAD equation (1) with normalized target and reference images instead of the actual values. The values of pixels $T(x,y)$ and $R(x,y)$ from a certain block of the target and reference images, respectively, are normalized in some manner, preferably to a mean (average) of the values of the pixels in that block. That is, a mean intensity value of the pixels in a particular block is first calculated, and the differences between the intensities of the individual pixels in that block and the mean are calculated. It is these normalized values, denoted as $\tilde{T}(x,y)$ and $\tilde{R}(x,y)$, that are then used in the equation (1), which then becomes, for mean normalized values:

$$MNSAD(MV_x, MV_y) = \sum_{y=1}^{bh} \sum_{x=1}^{bw} |\tilde{T}(x, y) - \tilde{R}(x, MV_x, y, MV_y)| \quad (2)$$

where $$\tilde{T}(x, y) = T(x, y) - \frac{1}{bh \cdot bw}\sum_{y=1}^{bh}\sum_{x=1}^{bw} T(x, y), \quad (3)$$

and $$\tilde{R}(x, MV_x, y, MV_y) = \quad (4)$$
$$R(x + MV_x, y + MV_y) - \frac{1}{bh \cdot bw}\sum_{y=1}^{bh}\sum_{x=1}^{bw} R(x + MV_x, y + MV_y).$$

It will be noted from equations (3) and (4) that the target image mean is not a function of $MV_x$ or $MV_y$, but that the reference mean is calculated for each $MV_x$ and $MV_y$ over the respective pixel spans $-s_x \leq MV_x \leq s_x$ and $-s_y \leq MV_y \leq s_y$. The mean normalized SAD of equation (2) is much better in handling illumination problems than the regular SAD of equation (1), since illumination changes typically affect more the mean value of the image and less the "edges" of the image. Therefore, subtracting the mean value from the individual pixel values of both of the reference and target images reduces the influence of the illumination change.

Figure 3:
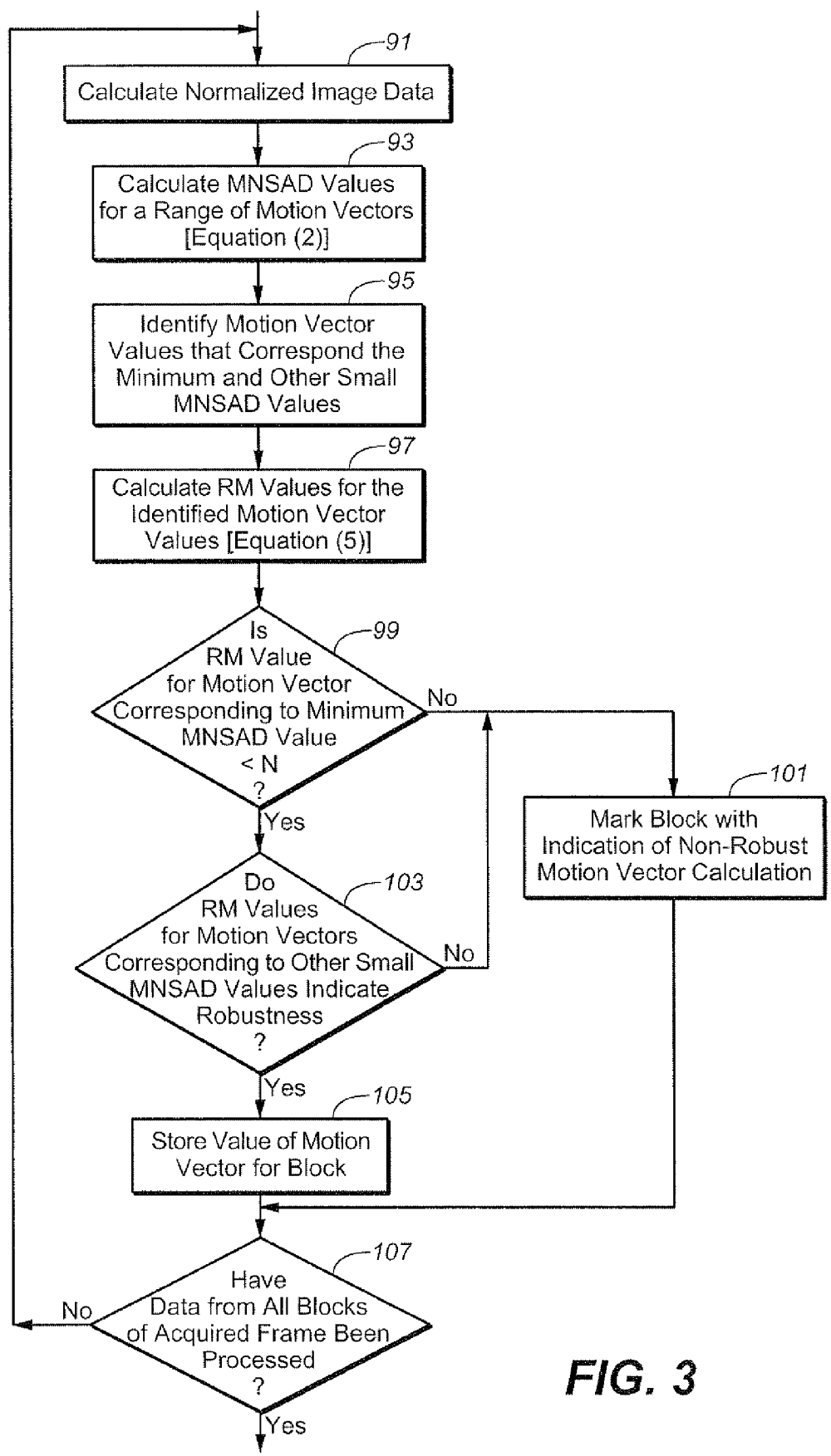
FIG. 3 is a flow chart that illustrates a motion calculation algorithm used in the operation of FIG. 2.

Referring to FIG. 3, a method of calculating the motion estimate at 73 of FIG. 2 for a block of pixels is illustrated. The mean normalized pixel intensity data is calculated at 91. The normalized data are then used in equation (2) to calculate minimum MNSAD values for each block, as indicated at 93 of FIG. 3. Once the minimum MNSAD for a block of pixels is determined, the components $MV_x$ and $MV_y$ of the motion vectors of equation (2) that gave that minimum are known.

However, as with a conventional application of the SAD equation (1), the minimum value of MNSAD according to equation (2) does not include an indication of how good the match is between the reference and target images. Therefore, at 95, a number of small MNSAD values resulting from the calculations with equation (2) are noted, in addition to the minimum, and used to determine an additional plurality of sets of motion vectors. These are the smallest MNSAD values that have been calculated, in addition to the minimum. The number of these additional small MNSAD values that are used is desirably kept low, such as 3-5 of them in a specific example, so as to not unnecessarily increase the number of calculations that need to be made. The components $MV_x$ and $MV_y$ of the motion vectors obtained from the minimum and other small MNSAD calculations are then inserted into the following robustness measure (RM) function (confidence function), at 97 of FIG. 3, one set at a time, to determine the quality of the motion vector solution made by use of equation (2):

$$RM(MV_x, MV_y) = \frac{\sum_{y=1}^{bh}\sum_{x=1}^{bw} |\tilde{T}(x-y) - \tilde{R}(x, MV_x, y, MV_y)|}{\sum_{y=1}^{bh}\sum_{x=1}^{bw} |\tilde{T}(x, y)| + \sum_{y=1}^{bh}\sum_{x=1}^{bw} |\tilde{R}(x, MV_x, y, MV_y)|} \quad (5)$$

Note that the numerator of equation (5) is the MNSAD function of equation (2), which takes the difference between normalized values of the target and reference images. The denominator is a sum of the normalized values of the target and reference images, which serves to normalize the MNSAD numerator. The solution of equation (5) is a unitless ratio between zero and one. That is, $0 \leq RM(MV_x, MV_y) \leq 1$. If $RM(MV_x, MV_y)$ is calculated by equation (5) to be close to zero, this indicates the robustness and accuracy of the motion vectors $MV_x$, $MV_y$ calculated by equation (2). Therefore, if the value of $RM(MV_x, MV_y)$ calculated by equation (5) is less than a set threshold N, as indicated at 99 of FIG. 3, the motion vectors used to make the calculation may then be accepted as accurate, at least tentatively. The threshold N is typically set to be low, somewhere between 0.1 and 0.3. If $RM(MV_x, MV_y)$ is greater than this threshold, it is determined that a good motion estimate cannot be made for the subject block of pixels and an indication of that is stored, at 101, after which the processing proceeds to 107.

If the robustness measure (RM) passes the test of 99, a further check is preferably made before finally accepting the motion estimate. The reason that RM values were calculated by equation (5) at 97 for motion vectors identified at 95 that correspond to small MNSAD values other that the minimum, is to enable a further inquiry at 103. This checks the values of the other RM calculations to see how close they are to the minimum value. If they are very close, this shows that the minimum is not very unique and the motion vector obtained from the minimum value of MNSAD by equation (2) may not be accurate. A quantitative way to make the determination at 103 is to determine whether the RM values of these other MNSAD values are greater than a threshold M that is set to be higher than the threshold N. The thresholds N and M may be set, for example, to be separated by more than 0.2 to 0.4. Alternatively, the threshold M may be selected during the calculation of each motion vector as some set amount, such as something between 0.05 and 0.3, greater than the calculated global minimum RM. The threshold M can then be different during the calculation of different motion estimates. If all of these other motion vectors give RM values in excess of M, then the motion vector originally determined to pass at 99 is stored, at 105, and the processing then proceeds to 107. But if any of these other motion vectors do not pass this test, then the block is marked, at 101, with an indication that the no robust estimate of motion can be made for the block, and the processing then precedes to 107.

Optionally, the determination made at 103 may include considering, in addition to the differences between the global minimum and other minima values of RM, differences in the values of the motion vectors that were used to calculate those RMs. Even if one or more other minima differ in RM value from the global minimum by less than M, the motion vector used to calculate the global minimum RM value may be determined to be robust and therefore not rejected if the motion vectors used to calculate those other minima are close to that of the global minimum. That is, if the motion vectors used to calculate those other minimum RM values are themselves close in value to that of the global minimum, then they are, in effect, all part of the global minimum. Whether they are close enough may be decided by a comparing the differences with predetermined thresholds $\Delta MV_x$ and $\Delta MV_y$. If the differences between some or all of the motion vectors of the minima and that of the global minimum are less than the threshold, then the motion vector of the global minimum is taken to be the motion estimate, even if one or more of the RM values of the other minima is not greater than that of the global minimum by M.

If there are more blocks of pixels of the image frame for which motion vectors are to be calculated, as indicated at 107, the process then returns to 91 for begin making the calculations for the next block of pixels in order. This continues until the calculations of FIG. 3 have been made for all the blocks of the two image frames, at which time the processing proceeds to 75 of FIG. 2.

Figure 5A:
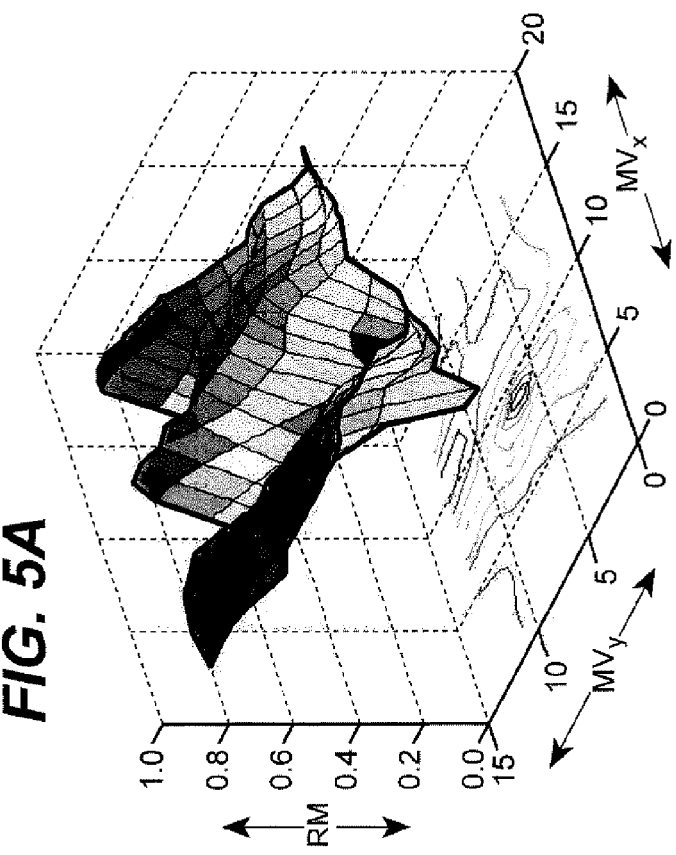
FIGS. 5A and 5B are plots of metrics that illustrate a portion of the algorithm of FIG. 3.
Figure 5B:
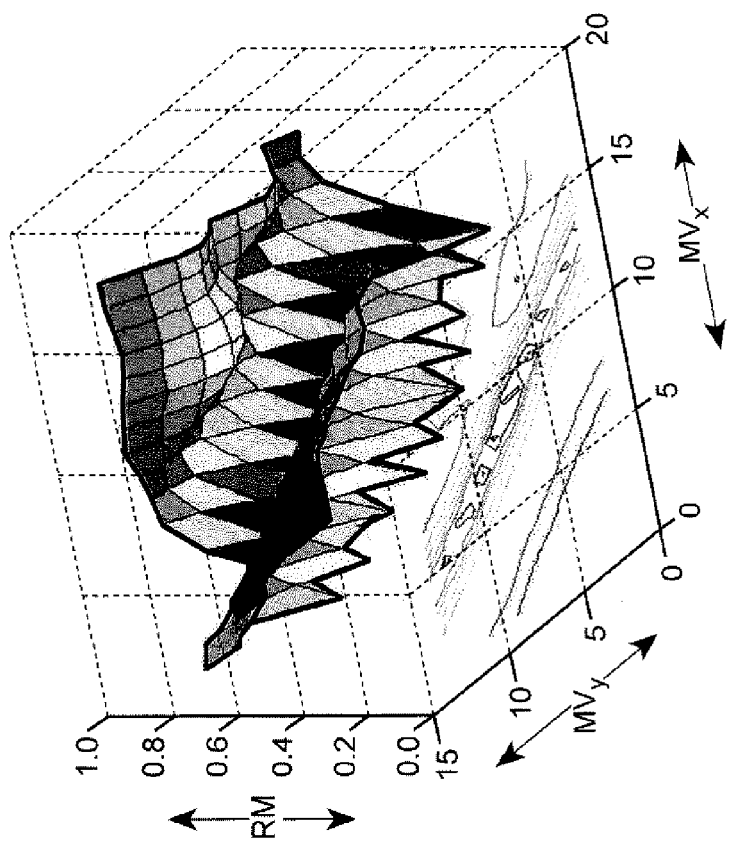

The character of the results that may be obtained by use of the robustness equation (5) are illustrated in FIGS. 5A and 5B, where the calculated values of $RM(MV_x, MV_y)$ are shown along the vertical axes from 0 to 1. FIGS. 5A and 5B illustrate the resulting calculations for two different sets of data. In each case, RM was calculated for each of 100 different motion vectors $[MV_x, MV_y]$. In the example of FIG. 5A, there is a global minimum corresponding to a robust motion vector since the minimum is unique and its value is close to zero. (That is, less than the threshold N.) On the other hand, the example of FIG. 5B shows a number of local minima that are close in RM value. Any global minimum calculated in the example of FIG. 5B is clearly non-robust, since there are many local minima with similar values. The values of these other RM minima are not all in excess of M, and are clearly separated from each other by significant distances $[\Delta MV_x, \Delta MV_y]$. This can occur, for example, when the target and reference images have recurring patterns and this makes it difficult to decide upon the true relative displacement between the images.

To summarize, the techniques described herein that include use of equation (5) provide a simple algorithm for the calculation of a confidence metric that will indicate whether the current motion vectors resulting from the calculation of equation (2) are robust (reliable). That is, the motion vector is reliable if both the following occur:
  (i) The RM value at the global minimum is smaller than some predefined threshold N. It is clear from equation (5) that small values of RM indicate that the target and reference images are alike after one is shifted with respect to the other by the number of pixels of the motion vector components $MV_x$ and $MV_y$.
  (ii) Other local minima of the RM function are higher than another predefined threshold M (which indicates that the other possible motion vectors correspond to low similarity between target and reference images) or, optionally, if less than M, are based on other motion vectors that are very close to that of the global RM minimum (which indicates that the other minima are, in effect, part of the global minimum). The goal of this added test is to verify that the relative shift of the target and reference images that provides the similarity of the target and reference images determined by (i), and thus gives a motion estimate, has resulted from the motion between them and not because of some other factor such as the pattern of the image.

This confidence metric and its use provides a clear indication of whether the motion estimates made by use of either the SAD equation (1) or the MNSAD equation (2) are good or not.

The above-described processing techniques have an advantage of being efficient. If one-hundred different motion vector combinations are assumed for making a motion estimate of a block of pixels, for example, values of MNSAD are calculated by equation (2) for all of them but values of RM need to be calculated by equation (5) for only a portion of the smallest values of MNSAD, such as from 3-6 percent, in a specific example, as a check on the determination made by the equation (2) calculations. This is significant because calculations of RM using equation (5) are much more processing intensive than calculations of MNSAD using equation (2), primarily because of the necessary arithmetic division of equation (5).

However, in situations where the added processing is not as much of a concern, the motion estimate may more directly be made by using equation (5) alone, without first making the MNSAD calculations of equation (2). In the example of one-hundred different assumed motion vector combinations, a calculation would be made with equation (5) for each of them. The motion vector used in the calculation that gives the minimum RM then provides a tentative global estimate of the motion. This tentative estimate is accepted as a robust estimate of motion if the two conditions described above exist, namely that (1) the minimum value of RM be less that the threshold N, and (2) any other local minima have values of RM in excess of the threshold M or, optionally, if less than the threshold M, are calculated from vectors that are very close to that of the global minimum.

Further, in applying equation (5) by itself luminance values $T(x,y)$ and $R(x,y)$ may be used in place of the mean values $\tilde{T}(x,y)$ and $\tilde{R}(x,y)$, in applications where normalization of luminance values is unnecessary or undesirable for some reason. It should also be noted that the processes described above for the calculations using equations (2) and (5) may be implemented without the initial normalization of pixel values, by the use of equations (1) and (5), where $T(x,y)$ and $R(x,y)$ are used in place of the mean values $\tilde{T}(x,y)$ and $\tilde{R}(x,y)$ of equation (5).

CONCLUSION

Although the various aspects of the present invention have been described with respect to exemplary embodiments thereof, it will be understood that the present invention is entitled to protection within the full scope of the appended claims.

It is claimed:
1. A method of operating an electronic imaging device, comprising:
    acquiring luminance data of a succession of image frames of an object scene,
    normalizing the luminance data of the individual acquired image frames,
    utilizing the normalized luminance data to calculate estimates of motion of the object scene between successive frames, and
    utilizing the acquired luminance data of the image frames without the normalization for processing and storage in a manner that image frames are reconstructable from the stored luminance data, wherein the motion estimate is used to either control the acquisition of the data of the image frames or the processing of the data of the image frames or both.

2. The method of claim 1, wherein normalizing the luminance data of the individual image frames includes using mean values of the luminance data of the frame.

3. The method of claim 2, wherein normalizing the luminance data of one of the image frames further includes calculating differences between the luminance data of the one frame and mean values for that one frame.

4. The method of claim 1, wherein acquiring image luminance data includes illuminating the object scene with different levels of illumination during acquisition of data of successive image frames of the object scene.

5. The method of claim 1, wherein acquiring image luminance data includes doing so while the object scene is illuminated with flickering light.

6. The method of claim 1, wherein acquiring image luminance data includes illuminating the object scene with a source of fluorescent light.

7. The method of claim 1, additionally comprising:
calculating a confidence matrix from the normalized luminance data that indicates the robustness of individual motion estimates, and
utilizing the confidence matrix to either accept or reject the individual motion estimates.

8. The method of claim 7, wherein calculating the confidence matrix includes dividing of absolute differences in luminance between the successive image frames by a sum of absolute values of the luminance of the successive image frames.

9. The method of claim 8, wherein utilizing the confidence matrix includes accepting the individual motion estimates when the confidence matrix thereof provides a global minimum that is less than a predefined threshold.

10. The method of claim 9, wherein the predefined threshold is within a range of 0.1 to 0.3.

11. The method of claim 8, wherein utilizing the confidence matrix includes accepting the individual motion estimates when (1) the confidence matrix thereof provides a global minimum that is less than a predefined first threshold, and (2) the confidence matrix thereof provides a plurality of additional small values that are in excess of a second threshold.

12. The method of claim 8, wherein utilizing the confidence matrix includes accepting the individual motion estimates when (1) the confidence matrix thereof provides a global minimum that is less than a predefined first threshold, and (2) the confidence matrix thereof provides a plurality of additional values that are in excess of a second threshold, or, if the plurality of additional values are less than the second threshold, the motion vectors thereof are different from the motion vector of the global minimum by less than a set amount.

13. The method of claim 11, wherein the predefined first threshold is within a range of 0.1 to 0.3.

14. The method of claim 13, wherein the second threshold is within a range of 0.2 to 0.4 above the first threshold.

15. The method of claim 13, wherein the second threshold is within a range of 0.05 to 0.3 above the calculated global minimum.

16. The method of claim 12, wherein the predefined first threshold is within a range of 0.1 to 0.3.

17. The method of claim 16, wherein the second threshold is within a range of 0.2 to 0.4 above the first threshold.

18. The method of claim 16, wherein the second threshold is within a range of 0.05 to 0.3 above the calculated global minimum.

19. A method of operating an electronic imaging device, comprising:
acquiring image luminance data from a two-dimensional sensor of a succession of at least reference and target image frames,
determining, from the acquired image data, a mean luminance of at least a portion of each of the reference and target image frames
subtracting the mean luminance of the at least a portion of the reference frame from the acquired luminance data of the at least a portion of the reference frame in order to obtain difference luminance values of the reference frame,
subtracting the mean luminance of the at least a portion of the target frame from the acquired luminance data of the at least a portion of the target frame in order to obtain difference luminance values of the target frame,
calculating, from the reference frame and target frame difference luminance values, an estimate of motion of said at least a portion of the image between the reference and target frames,
using the motion estimate to (1) set at least one parameter utilized to acquire data of an image frame of interest in a manner to reduce an effect thereon of the estimated motion, or (2) process the data of the image frame of interest, or (3) both of uses (1) and (2), and
utilizing the acquired luminance data of the image frame of interest without the normalization for processing and storage in a manner that the image frame of interest is reconstructable from the stored luminance data.

20. The method of claim 19, wherein the image frame of interest is the target image frame.

21. The method of claim 19, wherein data of the image frame of interest are acquired after data of the reference and target image frames are acquired.

22. The method of claim 19, additionally comprising:
calculating a confidence function from the normalized luminance data that indicates the robustness of individual motion estimates, including dividing an absolute difference in luminance between the reference and target image frames by a sum of the an absolute values of luminance of the reference and target image frames, and
utilizing the confidence function to either accept or reject the individual calculated motion estimates.

23. The method of claim 22, wherein utilizing the confidence function includes rejecting individual motion estimates unless the confidence function thereof provides a global minimum that is less than a predefined threshold and any additional minima are in excess of the global minimum by a defined amount.

24. The method of claim 19, wherein using the motion estimate to set at least one parameter includes setting at least one of a duration, intensity or timing of a light pulse emitted by a source of artificial light that illuminates the object scene while acquiring data of the image frame of interest.

25. The method of claim 19, wherein using the motion estimate to set at least one parameter includes calculating one or more exposure parameters including exposure duration that is used to acquire data of the image frame of interest.

26. The method of claim 19, wherein using the motion estimate to process data includes using the motion estimate in a compression of the data acquired of the image frame of interest.

27. The method of claim 19, wherein using the motion estimate to process data includes using the motion estimate to stabilize the image frame of interest.

28. A method of operating an electronic imaging device, comprising:
  acquiring image luminance data from a two-dimensional sensor of at least a reference image frame and a target image frame,
  calculating, from the reference frame and the target frame luminance data, an estimate of motion of said at least a portion of the image between the reference and target frames, which includes calculating an absolute difference in luminance between at least the portion of the reference and the target image frames,
  calculating, from the reference frame and the target frame luminance data, a robustness function that includes dividing the absolute difference in luminance between at least the portion of the reference and the target image frames by a sum of the absolute values of luminance of at least the portion of the reference and the target image frames, and
  utilizing the robustness function to determine whether the calculated estimate of motion is robust.

29. The method of claim 28, wherein utilizing the robustness function includes rejecting the calculated estimate of motion unless the robustness function provides a global minimum that is less than a predefined threshold.

30. The method of claim 29, wherein utilizing the robustness function additionally includes rejecting the calculated estimate of motion if the robustness function provides any additional local minima with values separated from the global minimum by more than a defined amount.

31. The method of claim 30, wherein the predefined threshold is within a range of 0.1 to 0.3, and the defined amount is within a range of 0.05 to 0.3.

32. The method of claim 29, wherein utilizing the robustness function additionally includes rejecting the calculated estimate of motion if the robustness function provides any additional local minima with values separated from the value of the global minimum by less than a defined amount and calculated from motion vectors separated from the vector location of the global minimum by more than a set amount.

33. The method of claim 32, wherein the predefined threshold is within a range of 0.1 to 0.3, and the defined amount is within a range of 0.05 to 0.3.

34. An image acquisition device, comprising:
  a two-dimensional photosensor,
  an optical system positioned to direct an image onto the photosensor of an object scene, and
  a processor that receives luminance data of a succession of image frames from the photosensor, and which operates to:
    normalize the luminance data of the individual image frames,
    utilize the normalized luminance data to calculate estimates of motion of the object scene between successive frames, and
    utilize the luminance data of the image frames without the normalization for processing and storage in a manner that image frames are reconstructable from the stored luminance data, and
    wherein the motion estimate is used to either control the acquisition of the data of the image frames or the processing of the data of the image frames or both.

35. An image acquisition device, comprising:
  a two-dimensional photosensor,
  an optical system positioned to direct an image onto the photosensor of an object scene, and
  a processor that receives luminance data of a succession of image frames from the photosensor, and which operates to:
    calculate, from the luminance data of at least first and second of the image frames, an estimate of motion of said at least a portion of the image between the first and second image frames, which includes calculating an absolute difference in luminance between at least the portion of the first and second image frames,
    calculate, from the luminance data of the first and second of the image frames, a robustness function that includes dividing the absolute difference in values of luminance between at least the portion of the first and second image frames by a sum of the absolute values of luminance of at least the portion of the first and second image frames, and
    utilize the robustness function to determine whether the calculated estimate of motion is robust.

36. The image acquisition device of claim 34, wherein the processor additionally operates to:
  calculate a confidence function from the normalized luminance data that indicates the robustness of individual estimates of motion, and
  utilize the confidence function to either accept or reject the individual estimates of motion.

37. The image acquisition device of claim 36, wherein utilizing the confidence function includes rejecting individual estimates of motion unless the confidence function thereof provides a global minimum that is less than a predefined threshold and any additional minima are in excess of the global minimum by a defined amount.

38. The image acquisition device of claim 34, wherein using the motion estimate to process data includes using the motion estimate to stabilize the image frame of interest.

39. The image acquisition device of claim 35, wherein utilizing the robustness function additionally includes rejecting the calculated estimate of motion unless the robustness function provides a global minimum that is less than a predefined threshold.

40. The image acquisition device of claim 39, wherein utilizing the robustness function includes rejecting the calculated estimate of motion if the robustness function provides an additional local minima with values separated from the global minimum by more than a defined amount.

41. The image acquisition device of claim 39, wherein utilizing the robustness function additionally includes rejecting the calculated estimate of motion if the robustness function provides any additional local minima with values separated from the value of the global minimum by less than a defined amount and calculated from motion vectors separated from the vector location of the global minimum by more than a set amount.

* * * * *